US010880776B2

(12) United States Patent
Sunagawa et al.

(10) Patent No.: US 10,880,776 B2
(45) Date of Patent: Dec. 29, 2020

(54) TERMINAL MANAGEMENT DEVICE, MOBILE COMMUNICATION CONTROL SYSTEM, AND MOBILE COMMUNICATION CONTROL METHOD

(71) Applicant: NEC Corporation, Minato-ku (JP)

(72) Inventors: Yuta Sunagawa, Tokyo (JP); Satoshi Kuroda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 11 days.

(21) Appl. No.: 16/316,387

(22) PCT Filed: Jul. 21, 2017

(86) PCT No.: PCT/JP2017/026381
§ 371 (c)(1),
(2) Date: Jan. 9, 2019

(87) PCT Pub. No.: WO2018/021162
PCT Pub. Date: Feb. 1, 2018

(65) Prior Publication Data
US 2019/0306746 A1 Oct. 3, 2019

(30) Foreign Application Priority Data
Jul. 26, 2016 (JP) .................................. 2016-146265

(51) Int. Cl.
H04W 28/08 (2009.01)
H04W 36/10 (2009.01)
(Continued)

(52) U.S. Cl.
CPC ........... H04W 28/08 (2013.01); H04W 36/10 (2013.01); H04W 36/12 (2013.01); H04W 36/22 (2013.01); H04W 92/14 (2013.01)

(58) Field of Classification Search
None
See application file for complete search history.

(56) References Cited

U.S. PATENT DOCUMENTS

2012/0264455 A1  10/2012  Yasuoka
2014/0051442 A1*  2/2014  Yang ..................... H04W 36/12
                                                          455/436
(Continued)

FOREIGN PATENT DOCUMENTS

CN    102075871 A    5/2011
JP    2012004874 A   1/2012
(Continued)

OTHER PUBLICATIONS

International Search Report,dated Sep. 19, 2017 from the International Bureau in counterpart International application No. PCT/JP2017/026381.
(Continued)

Primary Examiner — Anh Ngoc M Nguyen

(57) ABSTRACT

A terminal management device 40-1 includes: a setting unit 41-1 which generates group information by setting, based on a standard, a group to which a mobile terminal device to be managed belongs, wherein, when a process for managing the communication state of mobile terminal devices belonging to the same group is taken over by another device 40-2, the setting unit 41-1 notifies a correspondent device 50 of the group information so that the correspondent device 50, as for the mobile terminal devices belonging to the same group, can modify the object of control from the device 40-1 to the other terminal management device 40-2; a storage unit 42-1 in which the group information is stored; and a control unit 43-1 which implements control such that the process of managing the communication state of the mobile terminal devices is taken over by the other device 40-2 comprehensively on a group unit basis.

14 Claims, 6 Drawing Sheets

(51) Int. Cl.
*H04W 36/12* (2009.01)
*H04W 36/22* (2009.01)
*H04W 92/14* (2009.01)

(56) References Cited

U.S. PATENT DOCUMENTS

| | | | |
|---|---|---|---|
| 2014/0185585 A1* | 7/2014 | Zhang | H04W 36/0033 370/331 |
| 2016/0057681 A1 | 2/2016 | Wang et al. | |
| 2016/0095036 A1* | 3/2016 | Stojanovski | H04W 76/11 370/331 |

FOREIGN PATENT DOCUMENTS

| | | |
|---|---|---|
| JP | 2012004912 A | 1/2012 |
| JP | 2012253562 A | 12/2012 |
| JP | 2013511888 A | 4/2013 |
| JP | 2014533011 A | 12/2014 |
| WO | 2014/001463 A2 | 1/2014 |
| WO | 2015178035 A1 | 11/2015 |

OTHER PUBLICATIONS

Written Opinion, dated Sep. 19, 2017 from the International Bureau in counterpart International application No. PCT/JP2017/026381.
3GPP, TS 23.401 V9.2.0 (Sep. 2009), General Packet Radio Service (GPRS) enhancements for Evolved Universal Terrestrial Radio Access Network (E-UTRAN) access (Release 9), http://www.3gpp.org/ftp/Specs/archive/23_series/23.401/23401-920.zip, Oct. 1, 2009, 245 pages.
Communication dated Apr. 5, 2019, from the European Patent Office in counterpart European Application No. 17834170.7.
LG Electronics, et al., "Solution proposal on Key Issue 2 "NAS level congestion Control based on DCN"", 3GPP Draft, SA WG2 Meeting S2#115, Nanjing, P.R. China, May 27, 2016, S2-163068 (3 pages total).

* cited by examiner

TERMINAL MANAGEMENT DEVICE, MOBILE COMMUNICATION CONTROL SYSTEM, AND MOBILE COMMUNICATION CONTROL METHOD

This application is a National Stage Entry of PCT/JP2017/026381 filed on Jul. 21, 2017, which claims priority from Japanese Patent Application 2016-146265 filed on Jul. 26, 2016, the contents of all of which are incorporated herein by reference, in their entirety.

TECHNICAL FIELD

The invention of the present application relates to a technique for, in a system which controls mobile communication, redistributing a load of processing for mobile communication control within the system.

BACKGROUND ART

A data amount of communication using a portable terminal device typified by a smartphone has been rapidly increasing year by year because of spread of portable terminal devices. Accordingly, because an amount of information processing performed by a system which controls mobile communication is also rapidly increasing, expectation for a technique which decreases a load of processing of such a system is rising.

As a technique related to such a technique, PTL 1 discloses a method of reducing an amount of signals transmitted and received between a packet switching station device and a serving gateway device, and decreasing a load of processing in these devices, when a plurality of packet data network (PDN) connections are disconnected. This method requests a serving gateway device in an area to which a target mobile machine has belonged in a mobile communication system of a first communication scheme, to disconnect, from a packet switching station in an area to which the target mobile machine belongs in a mobile communication system of a second communication scheme, a PDN connection set for a target mobile station starting from the serving gateway device. In this method, a disconnection signal, having a structure which can set a subscriber identifier corresponding to the target mobile station and PDN connection information to be taken over, is transmitted to the serving gateway device from the packet switching station. In this method, a serving gateway device receiving the disconnection signal searches for and disconnects a PDN connection to be disconnected, based on the subscriber identifier and the PDN connection information to be taken over, which are set in the disconnection signal.

Furthermore, PTL 2 discloses a wireless communication system which decreases a load of processing in a base station performing a cell adjustment. This system includes a plurality of base stations accommodating a mobile station, a gateway device accommodating a base station, and a self-organizing network (SON) server which groups the base stations by a predetermined method and then optimizes a cell. When processing of grouping base stations is performed, the SON server selects, based on a load of processing of each base station, a master base station which communicates with a gateway device, by representing base stations classified into a same group. Then, a base station selected as a master base station transmits and receives control information and user data to and from another base station in such a way that a same downlink signal is transmitted from a local station and the another base station belonging to the same group as the local station.

CITATION LIST

Patent Literature

[PTL 1] Japanese Unexamined Patent Application Publication No. 2012-004912
[PTL 2] Japanese Unexamined Patent Application Publication No. 2012-004874

SUMMARY OF INVENTION

Technical Problem

For example, in an evolved packet core (EPC) network accommodating a long term evolution (LTE) network provided in a current mobile phone communication service, such a technique as "load re-balancing between mobility management entities (MMEs)" prescribed by the third generation partnership project (3GPP) TS23.401 is used. This technique is a technique for redistributing a load of processing in such a way that a load of processing is not biased to a particular MME among a plurality of MMEs being devices (nodes) included in an EPC network. Herein, an MME is a terminal management device which controls communication in a network by managing a communication state and the like of a mobile terminal device such as a mobile phone. By transmitting and receiving information to and from a serving gateway (S-GW) included in an EPC network, and an evolved Node B (eNodeB) being a base station accommodated by an S-GW, the MME performs communication control such as position registration and calling of a mobile terminal device, and handover between base stations.

When a load of processing is redistributed between MMEs, information necessary to redistribute the load is normally transmitted and received among an MME, an S-GW, and an eNodeB with a mobile terminal device as a unit (i.e., with a subscriber as a unit). Therefore, when processing for communication control regarding a large number of mobile terminal devices is simultaneously moved between MMEs, an amount of information transmitted and received among an MME, an S-GW, and an eNodeB becomes enormous. Against this problem, when an MME, an S-GW, and an eNodeB are formed as devices having a high degree of processing capability, cost of constructing a communication infrastructure rises. Moreover, when a delay occurs in processing of redistributing a load of processing between MMEs due to an enormous information amount described above, there is a concern that a call loss and the like occur. The techniques indicated by PTLs 1 and 2 cannot be said to be sufficient to solve this problem. A main object of the invention of the present application is to provide a mobile communication control system and the like which solve this problem.

Solution to Problem

A terminal management device according to one aspect of the invention of the present application is any one of a plurality of terminal management devices which manage communication states of one or more mobile terminal devices, and which control a correspondent device in such a way as to communicably connect the mobile terminal device to an external device, and includes: a setting means for generating group information associating the mobile terminal device with the group, by setting, based on a criterion, a group to which the mobile terminal device to be managed belongs, and notifying the correspondent device of the group information in such a way that, when processing of managing communication states of the mobile terminal devices belonging to the same group is taken over to another terminal management device, the correspondent device is able to change an object of control from a local device to the another terminal management device, based on the group information, with respect to the mobile terminal devices belonging to the same group; a storage means for storing the group information; and a control means for controlling the another terminal management device, in such a way that the another terminal management device takes over the processing of managing a communication state of the mobile terminal device with the group as a unit based on the group information stored in the storage means.

In another aspect of achieving the above-described object, a mobile communication control method according to one aspect of the invention of the present application includes: in a system including first and second terminal management devices which manage communication states of one or more mobile terminal devices, and a correspondent device which communicably connects the mobile terminal device to an external device being controlled by the terminal management device, by the first terminal management device, notifying the correspondent device of group information that is generated by setting, based on a criterion, a group to which the mobile terminal device to be managed belongs, and that associates the mobile terminal device with the group, storing the group information in a storage means, and controlling the second terminal management device in such a way that the second terminal management device takes over the processing of managing a communication state of the mobile terminal device with the group as a unit based on the group information stored in the storage means; and, by the correspondent device, when the second terminal management device takes over the processing of managing communication states of the mobile terminal devices belonging to the same group from the first terminal management device, changing an object of control from the first terminal management device to the second terminal management device, based on the group information, with respect to the mobile terminal devices belonging to the same group.

Furthermore, in still another aspect of achieving the above-described object, a terminal management program according to one aspect of the invention of the present application is a program for executing: by any one of a plurality of terminal management devices which manage communication states of one or more mobile terminal devices, and which control a correspondent device in such a way as to communicably connect the mobile terminal device to an external device, setting processing of generating group information associating the mobile terminal device with the group, by setting, based on a criterion, a group to which the mobile terminal device to be managed belongs, and notifying the correspondent device of the group information in such a way that, when processing of managing communication states of the mobile terminal devices belonging to the same group is taken over to another terminal management device, the correspondent device is able to change an object of control from a local device to the another terminal management device, based on the group information, with respect to the mobile terminal devices belonging to the same group; storage processing of storing the group information in a storage means; and control processing of controlling the another terminal management device in such a way that the another terminal management device takes over the processing of managing a communication state of the mobile terminal device comprehensively with the group as a unit based on the group information.

Furthermore, the invention of the present application may also be achieved by a computer-readable nonvolatile recording medium saving the terminal management program (computer program).

Advantageous Effects of Invention

The invention of the present application enables decrease in an information processing amount necessary when a load of processing for mobile communication control is redistributed within a mobile communication system between terminal management devices in the system.

EXAMPLE EMBODIMENT

Hereinafter, example embodiments of the invention of the present application will be described in detail with reference to the drawings.

First Example Embodiment

Figure 1:
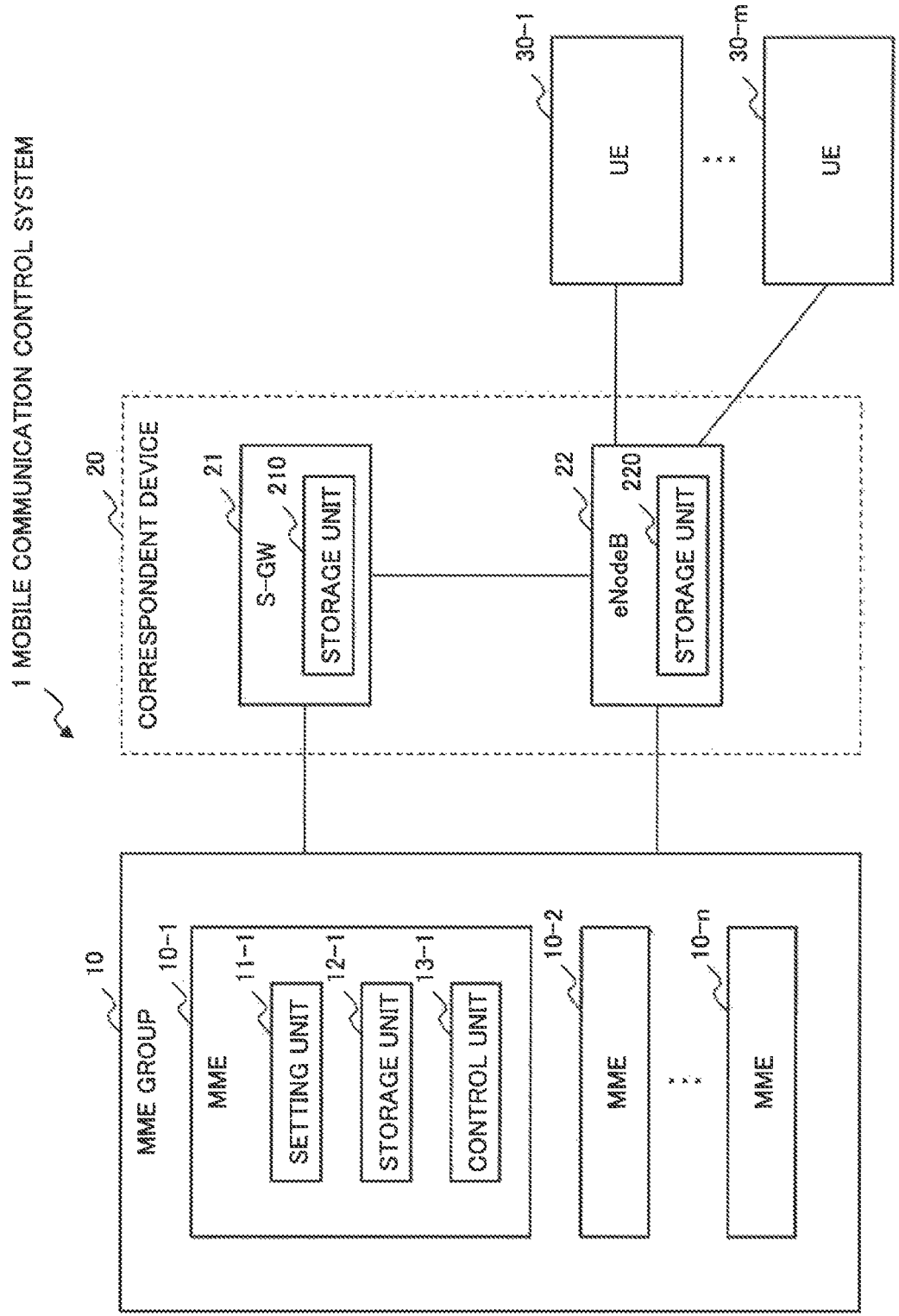
FIG. 1 is a block diagram illustrating a configuration of a mobile communication control system 1 according to a first example embodiment of the invention of the present application.

FIG. 1 is a block diagram conceptually illustrating a configuration of a mobile communication control system 1 according to a first example embodiment of the invention of the present application. The mobile communication control system 1 according to the present example embodiment broadly includes an MME group 10, an S-GW 21, and an eNodeB 22. The mobile communication control system 1 is a system which performs communication control for user equipment (UE) 30-1 to UE 30-*m* (m is any integer of 1 or more) being mobile terminal devices such as mobile phone.

The UE 30-1 to UE 30-*m* are communicably connected to the eNodeB 22 being a base station communicably connecting the UE 30-1 to UE 30-*m* to an external device. The S-GW 21 is a gateway accommodating the eNodeB 22. The MME group 10 is a terminal management device group which is communicably connected to the S-GW 21 and the eNodeB 22, and which performs communication control for the UE 30-1 to UE 30-*m* by managing communication states and the like of the UE 30-1 to UE 30-*m*. The S-GW 21 and the eNodeB 22 are devices correspondent to the MME group 10 in mobile communication control. In the present application, the S-GW 21 and the eNodeB 22 are hereinafter collectively referred to as a correspondent device 20 (correspondent node) in some cases. Note that FIG. 1 illustrates one S-GW 21 and one eNodeB 22 for convenience of description, but the mobile communication control system 1 illustrated in FIG. 1 may include a plurality of these devices.

The MME group 10 includes a plurality of MMEs 10-1 to 10-*n* (n is any integer of 2 or more). The MME group 10 has a function of redistributing a load of processing for mobile communication control among the MMEs 10-1 to 10-*n* in such a way that a load of processing for mobile communication control is not biased to a particular MME among the MMEs 10-1 to 10-*n*. Configurations and functions of the individual MMEs 10-1 to 10-*n* are equivalent.

Next, an operation of an MME is described in detail. The MME 10-1 includes a setting unit 11-1, a storage unit 12-1, and a control unit 13-1.

For example, when the UE 30-*i* (i is any integer of 1 or more) is connected to the MME 10-1 by an "attach request" signal, a "tracking area update (TAU) request" signal (position registration request signal), or the like via the correspondent device 20, the setting unit 11-1 sets (allocates), for (to) the UE 30-*i*, a group identification (ID) representing a group to which the UE 30-*i* belongs, based on a predetermined criterion. The "attach request" signal is a signal transmitted by the UE 30-*i* to register a local own device on a network when power of the UE 30 is turned on. The TAU signal is a signal transmitted by the UE 30-*i* to register a position of own device on a network (update a position of a own device).

As a criterion which is used when a group ID is set for the UE 30-*i*, the setting unit 11-1 may set, for example, with a physical resource or a logical resource regarding, the MME 10-1 as a unit, a value associated with the physical resource or the logical resource as a group ID. In this case, a physical resource is, for example, a physical device representing the MME 10-1, or a processor and the like incorporated in the MME 10-1. The logical resource is, for example, a virtual machine and the like which achieves the MME 10-1.

For example, when a processor A (not illustrated) incorporated in the MME 10-1 is executing processing of managing communication states of the UE 30-1 and UE 30-2, the setting unit 11-1 sets the same group ID for the UE 30-1 and UE 30-2. For example, when a virtual machine B (not illustrated) which achieves the MME 10-1 is executing processing of managing communication states of the UE 30-3 to UE 30-5, the setting unit 11-1 sets the same group ID for the UE 30-3 to UE 30-5.

As the criterion, or with a process which manages a communication state of the UE 30-*i* and which is executed by the MME 10-1 as a unit, the setting unit 11-1 may set a value associated with the process, as a group ID. For example, when a process C (not illustrated) executed by the MME 10-1 is executing processing of managing communication states of the UE 30-2 and UE 30-3, the setting unit 11-1 sets the same group ID for the UE 30-2 and UE 30-3.

As the criterion, or based on a number of UEs with communication states to be managed by the MME 10-1, the setting unit 11-1 may set a group ID. In this case, the setting unit 11-1 sets a group ID in such a way that, for example, a number of UEs which belong to one group and which are to be managed is less than or equal to a predetermined value. For example, when a number of UEs which belong to one group and which are to be managed is less than or equal to "10", the setting unit 11-1 sets a group ID to "1" for the UE 30-1 to UE 30-10, and sets a group ID to "2" for the UE 30-11 to UE 30-20.

The setting unit 11-1 generates group information tying (associating) the UE 30-*i* to (with) a group ID set for the UE 30-*i*, and saves the generated group information in the storage unit 12-1. For example, the storage unit 12-1 is a storage device such as a memory incorporated in the MME 10-1. In other words, the storage unit 12-1 stores a set group ID for each UE.

The setting unit 11-1 notifies the S-GW 21 and the eNodeB 22 of the group information. For example, by embedding a group ID (e.g., a value of 7 bits) set for the UE 30-*i* into a header part of a region of a "sender F-tunnel endpoint identifier (TEID)" included in a "create session request" signal or a "modify bearer request" signal transmitted to the S-GW 21, the setting unit 11-1 notifies the S-GW 21 of the group information. The "create session request" signal is a signal transmitted to the S-GW 21 when the MME 10-1 receives an "attach request" signal from the UE 30-*i*. The "modify bearer request" signal is a signal transmitted to the S-GW 21 when the MME 10-1 receives a "TAU request" signal from the UE 30-*i*. The "sender F-TEID" is defined by 3GPP TS29.274 and TS36.413, and is an identifier (identification information) with which a virtual direct circuit (tunnel) is able to be identified for each connection (session) of a circuit, being specified by the correspondent device 20.

For example, by embedding a group ID (e.g., a value of 7 bits) set for the UE 30-*i* into a header part of a region of an "S1APID" included in an "initial context setup request" signal transmitted to the eNodeB 22, the setting unit 11-1 notifies the eNodeB 22 of the group information. The "S1APID" is defined by 3GPP TS29.274 and TS36.413, and is an identifier (identification information) with which an S1 application protocol (AP) is able to be identified, being specified by the correspondent device 20.

The control unit 13-1 operates as follows when a load of processing for mobile communication control in the MME 10-1 increases, and leads to such a situation where at least part of the processing for mobile communication control needs to be moved to another MME. Specifically, based on the group information stored in the storage unit 12-1, the control unit 13-1 controls at least any one of MMES except for the MME 10-1, in such a way that at least any one of MMES except for the MME 10-1 takes over the processing of managing a communication state of the UE 30-*i* and the like comprehensively with a group to which the UE 30-*i* belongs as a unit. Note that a configuration in which the MME 10-1 to 10 *n* each manages a state of a load in own device and thus adjusts movement of processing for mobile communication control to and from another MME is an existing technique. Therefore, a description of details thereof is omitted.

When the UE 30-*i* being a target (release target), which processing for mobile communication control is to be moved from, is in a state of waiting (evolved packet system connection management (ECM)-IDLE), the control unit 13-1 performs processing of paging for the eNodeB 22. Accordingly, the MME 10-1, the eNodeB 22, and the UE 30-*i* perform processing of a "service request procedure". When the UE 30 is in a state of communicating (ECM-CONNECTED), the control unit 13-1 does not perform the processing of "paging" and the "service request procedure".

The control unit 13-1 notifies the S-GW 21 and the eNodeB 22 of group information regarding the UE 30-*i*. For example, by embedding a group ID (e.g., a value of 7 bits) set for the UE 30-*i* into a header part of a region of a "TEID" included in a "release access bearer request" signal transmitted to the S-GW 21, and padding a remaining part of the region of the "TEID" with "0", the control unit 13-1 notifies the S-GW 21 of the group information. The "release access bearer request" signal is a signal transmitted to the S-GW 21 when the MME 10-1 releases the UE 30-*i*. The "TEID" is defined by 3GPP TS29.274 and TS36.413, and is an identifier with which a tunnel is able to be identified for each session, being specified by the correspondent device 20.

For example, by embedding a group ID (e.g., a value of 7 bits) set for the UE 30-*i* into a header part of a region of an "S1APID" included in a "UE context release command" signal transmitted to the eNodeB 22, and padding a remaining part of the region of the "S1APID" with "0", the control unit 13-1 notifies the eNodeB 22 of the group information.

When notified of group information regarding the UE 30-*i* from the MME 10-1 by a "create session request" signal, a "modify bearer request" signal, or the like, the S-GW 21 stores the group information in a storage unit 210. For example, the storage unit 210 is a storage device such as a memory incorporated in the S-GW 21. The storage unit 210 stores the UE 30-*i* and a group ID thereof in association with each other. The S-GW 21 transmits a "create session response" signal or a "modify bearer response" signal to the MME 10-1 as a response to the "create session request" signal or the "modify bearer request" signal received from the MME 10-1. In this instance, the S-GW 21 embeds a group ID, notified from the MME 10-1 and set for the UE 30-*i*, into a header part of a region of a "sender F-TEID" included in each of the signals transmitted to the MME 10-1.

When receiving a "release access bearer request" signal including group information regarding the UE 30-*i* from the MME 10-1, the S-GW 21 performs, based on group information stored in the storage unit 210, release processing for the UE (the UE 30-*i*, and the like) associated with a group ID included in the group information. After completing the release processing, the S-GW 21 transmits, to the MME 10-1, a "release access bearer response" signal indicating that the release processing is completed.

When notified of group information regarding the UE 30-*i* from the MME 10-1 by an "initial context setup request" signal or the like, the eNodeB 22 stores the group information in a storage unit 220. For example, the storage unit 220 is a storage device such as a memory incorporated in the eNodeB 22. The storage unit 220 stores the UE 30-*i* and a group ID thereof in association with each other. The eNodeB 22 transmits an "initial context setup response" signal to the MME 10-1 as a response to the "initial context setup request" signal received from the MME 10-1. In this instance, the eNodeB 22 embeds a group ID, notified from the MME 10-1 and set for the UE 30-*i*, into a header part of a region of an "S1APID" included in the signal transmitted to the MME 10-1.

When receiving a "UE context release command" signal including group information regarding the UE 30-*i* from the MME 10-1, the eNodeB 22 performs, based on group information stored in the storage unit 220, release processing for the UE (the UE 30-*i*, and the like) associated with a group ID included in the group information. After completing the release processing, the eNodeB 22 transmits, to the MME 10-1, a "UE context release complete" signal indicating that the release processing is completed.

After completing the release processing for the UE 30-*i* and the like by the S-GW 21 and the eNodeB 22, the mobile communication control system 1 executes a "TAU procedure" regarding the UE 30-*i* and the like. In the "TAU procedure", for example, when the MME 10-2 takes over, from the MME 10-1, processing of managing a communication state of the UE (the UE 30-*i* and the like) associated with a group ID included in the group information, the MME 10-2 starts processing of managing a communication state of the UE 30-*i* and the like through control by the control unit 13-1 in the MME 10-1. Then, based on the group information, the S-GW 21 and the eNodeB 22 change an object of control from the MME 10-1 to the MME 10-2, with respect to the UE 30-*i* and the like.

Next, an operation (processing) of the mobile communication control system 1 according to the present example embodiment is described in detail with reference to sequence diagrams of FIGS. 2 to 4.

Figure 2:
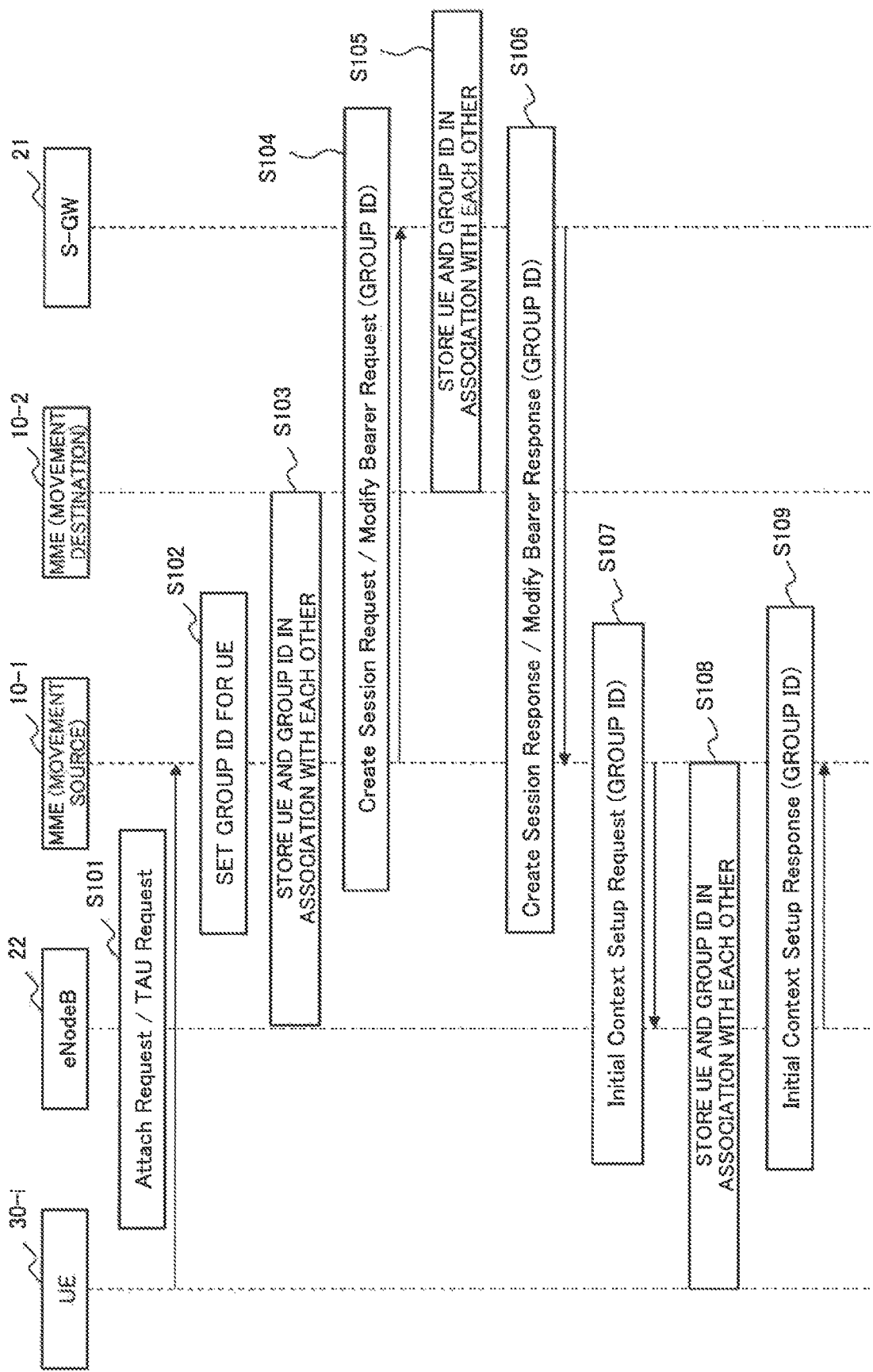
FIG. 2 is a sequence diagram illustrating an operation where the mobile communication control system 1 according to the first example embodiment of the invention of the present application sets a group ID for a UE connected to an MME.

FIG. 2 is a sequence diagram illustrating an operation where the mobile communication control system 1 according to the present example embodiment sets a group ID for the UE 30-*i* connected to the MME 10-1.

The MME 10-1 receives an "attach request" signal or a "TAU request" signal from the UE 30-*i* via the correspondent device 20 (step S101). The setting unit 11-1 in the MME 10-1 sets a group ID for the UE 30-*i*, based on a predetermined criterion (step S102). The storage unit 12-1 stores the UE 30-*i* and the set group ID in association with each other (step S103).

After embedding the group ID set for the UE 30-*i* into a region of a "sender F-TEID" in a "create session request" signal or a "modify bearer request" signal, the setting unit 11-1 transmits the signal to the S-GW 21 (step S104). The S-GW 21 stores the UE 30-*i* and the set group ID in the storage unit 210 in association with each other (step S105). After embedding the group ID into a region of a "sender F-TEID" in a "create session response" signal or a "modify bearer response" signal, the S-GW 21 transmits the signal to the MME 10-1 (step S106).

After embedding the group ID into a region of an "S1APID" in an "initial context setup request" signal, the setting unit 11-1 transmits the signal to the eNodeB 22 (step S107). The eNodeB 22 stores the UE 30-*i* and the set group ID in the storage unit 220 in association with each other (step S108). After embedding the group ID into a region of an "S1APID" in an "initial context setup response" signal, the eNodeB 22 transmits the signal to the MME 10-1 (step S109), and the overall processing ends.

Figure 3:
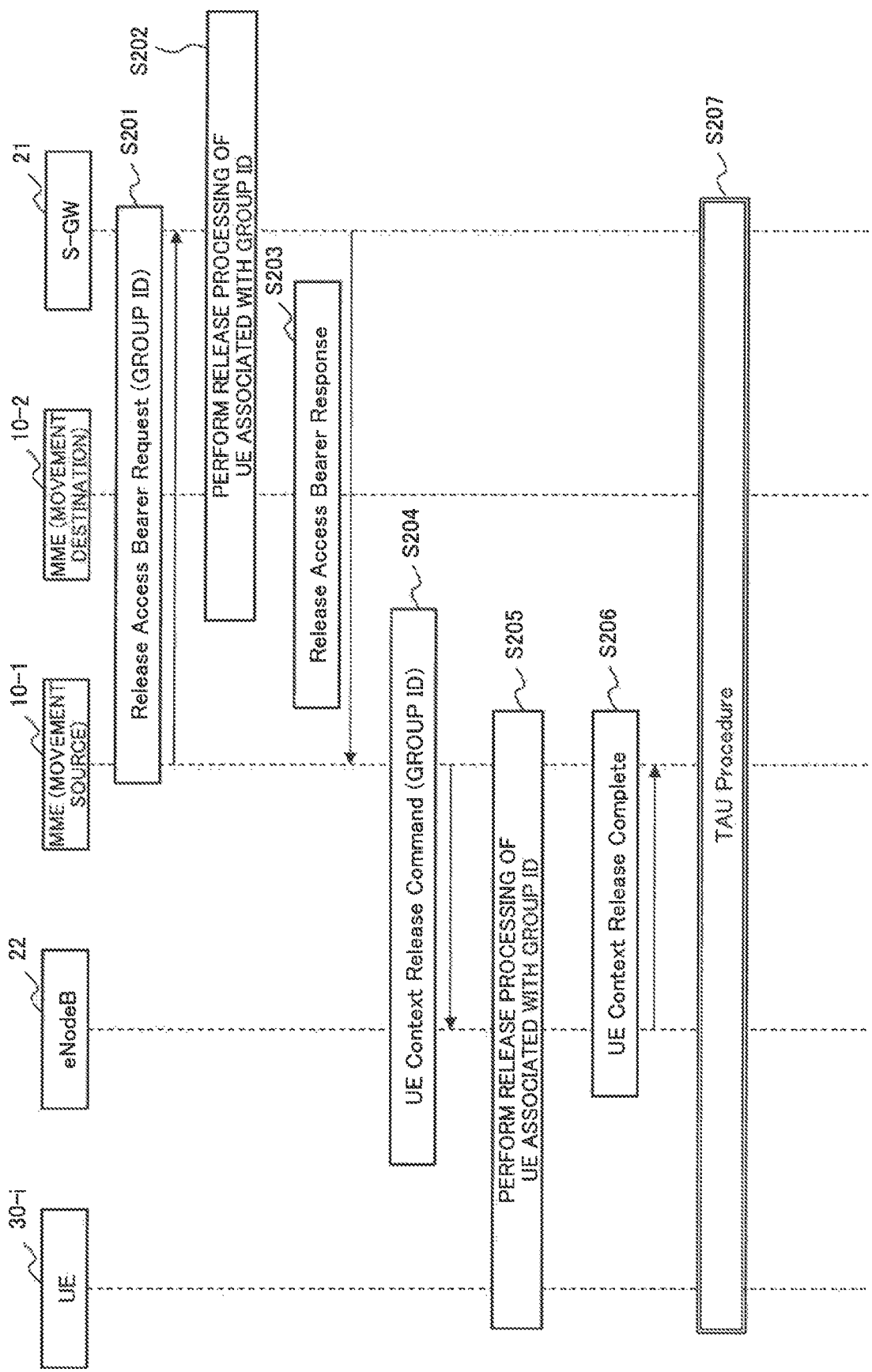
FIG. 3 is a sequence diagram illustrating an operation where the mobile communication control system 1 according to the first example embodiment of the invention of the present application redistributes a load between MMEs including an MME with which a UE to be managed is in communication.

FIG. 3 is a sequence diagram illustrating an operation where the mobile communication control system 1 according to the present example embodiment redistributes a load between MMEs including an MME with which the UE 30-*i* to be managed is in communication (ECM-CONNECTED).

After embedding a group ID set for the UE 30-*i* into a region of a "TEID" in a "release access bearer request" signal, the control unit 13-1 in the MME 10-1 transmits the signal to the S-GW 21 (step S201). The S-GW 21 performs release processing of the UE 30-*i* and the like associated with a group ID included in the received signal (step S202). After completing the release processing, the S-GW 21 transmits, to the MME 10-1, a "release access bearer response" signal indicating that the release processing is completed (step S203).

After embedding a group ID set for the UE 30-i into a region of an "S1APID" in a "UE context release command" signal, the control unit 13-1 transmits the signal to the eNodeB 22 (step S204). The eNodeB 22 performs release processing of the UE 30-i and the like associated with a group ID included in the received signal (step S205). After completing the release processing, the eNodeB 22 transmits, to the MME 10-1, a "UE context release complete" signal indicating that the release processing is completed (step S206). The mobile communication control system 1 executes a "TAU procedure" by the MME 10-1, the MME 10-2 being a movement destination of processing of managing a communication state, the S-GW 21, the eNodeB 22, and the UE 30-i and the like, and the overall processing ends.

Figure 4:
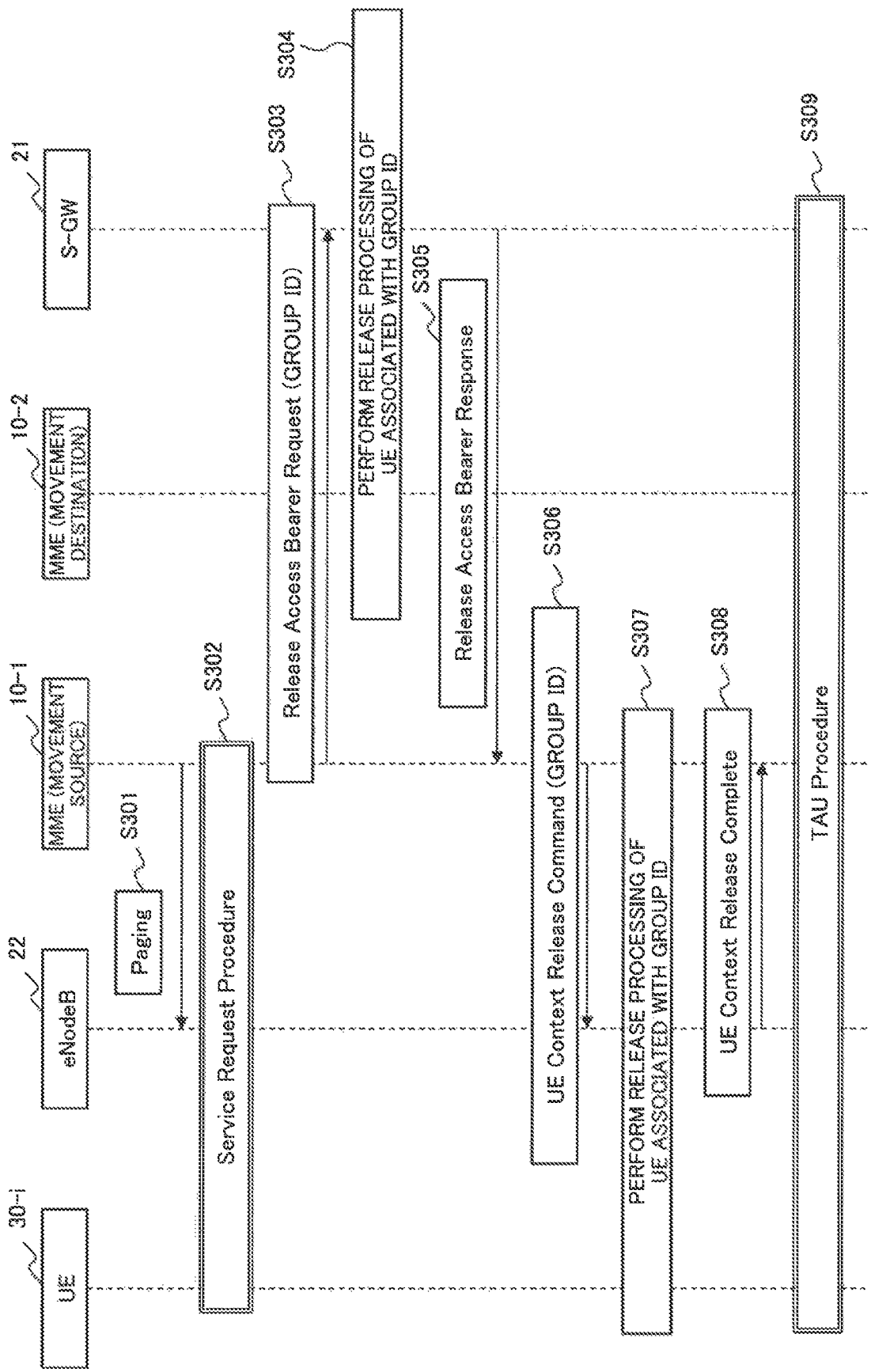
FIG. 4 is a sequence diagram illustrating an operation where the mobile communication control system 1 according to the first example embodiment of the invention of the present application redistributes a load between MMEs including an MME with which a UE to be managed is waiting.

FIG. 4 is a sequence diagram illustrating an operation where the mobile communication control system 1 according to the present example embodiment redistributes a load between MMEs including an MME for which the UE 30-i to be managed is waiting (ECM-IDLE).

The control unit 13-1 in the MME 10-1 performs "paging" for the eNodeB 22 (step S301). The mobile communication control system 1 performs a "service request procedure" by the MME 10-1, the eNodeB 22, and the UE 30-i (step S302). The mobile communication control system 1 performs processing in steps S303 to S309 being processing similar to that in the steps S201 to S207 illustrated in FIG. 3, and the overall processing ends.

The mobile communication control system 1 according to the present example embodiment is able to decrease an information processing amount necessary, when a load of processing for mobile communication control is redistributed within a mobile communication system, between terminal management devices in the system. A reason for this is as follows. The setting unit 11-1 in the MME 10-1 (terminal management device) notifies the correspondent device 20 of group information generated by setting, for the UE 30-i (mobile terminal device), a group to which the UE 30-i (mobile terminal device) belongs. Then, the MME group 10 and the correspondent device 20 perform, in a group unit, processing of redistributing a load of processing for mobile communication control within the system.

An advantageous effect achieved by the mobile communication control system 1 according to the present example embodiment is described below in detail.

When a load of processing is redistributed between MMEs in a mobile communication service in such a way that the load is not biased to a particular MME, information necessary to redistribute a load is normally transmitted and received among an MME, an S-GW, and an eNodeB with a mobile terminal device as a unit (i.e., with a subscriber as a unit). Therefore, when processing for communication control regarding a large number of mobile terminal devices is simultaneously moved between MMEs, an amount of information transmitted and received among an MME, an S-GW, and an eNodeB becomes enormous. Accordingly, there is a problem that construction cost of a communication infrastructure rises, or a trouble such as a call loss and the like occurs.

In order to solve such a problem, in the mobile communication control system 1 according to the present example embodiment, the MME 10-1 includes the setting unit 11-1, the storage unit 12-1, and the control unit 13-1. The setting unit 11-1 sets, based on a criterion, a group to which the UE 30-i to be managed belongs, thereby generates group information associating the UE 30-i with the group, and then notifies the correspondent device 20 of the group information. The storage unit 12-1 stores the group information. Based on the group information stored in the storage unit 12-1, the control unit 13-1 controls, for example, in such a way that the MME 10-2 takes over the processing of managing a communication state of the UE 30-i and the like comprehensively with a group as a unit. Then, when the MME 10-2 takes over, from the MME 10-1, the processing of managing a communication state of the UE 30-i and the like belonging to the group, the correspondent device 20 changes an object of control from the MME 10 1 to the MME 10-2, based on the group information, with respect to the UE 30-i and the like belonging to the group.

In other words, in the mobile communication control system 1 according to the present example embodiment, when a load of processing is redistributed between MMEs, information necessary to redistribute a load is transmitted and received between the MME group 10 and the correspondent device 20 not with a mobile terminal device (subscriber) as a unit but with a group set for a mobile terminal device as a unit. Thereby, the mobile communication control system 1 according to the present example embodiment is able to decrease an information processing amount necessary, when a load of processing for mobile communication control is redistributed within the mobile communication system, between terminal management devices in the system. Accordingly, the mobile communication control system 1 according to the present example embodiment is able to avoid such a problem that construction cost of a communication infrastructure rises, or a trouble such as a call loss and the like occurs.

Furthermore, as a criterion when a group ID is set for the UE 30-i, the setting unit 11-1 in the MME 10-1 according to the present example embodiment can use various criteria, such as criteria with a physical resource or a logical resource included in the MME 10-1 as a unit, criteria with a process executed by the MME 10-1 as a unit, criteria based on a number of UEs which are managed communication states, and the like. Therefore, the mobile communication control system 1 according to the present example embodiment is able to perform flexible communication control by flexibly grouping the UEs.

Still further, in the mobile communication control system 1 according to the present example embodiment, it is possible to use a method of embedding a group ID into a signal prescribed by 3GPP TS29.274 and TS36.413, as a method in which the MME 10-1 notifies the S-GW 21 and the eNodeB 22 of a group ID set for the UE 30-i. The MME 10-1 embeds a group ID into, for example, a region of a "sender F-TEID" included in a "create session request" signal or a "modify bearer request" signal transmitted to the S-GW 21, or a region of a "TEID" in a "release access bearer request" signal. The MME 10-1 embeds a group ID into, for example, an "initial context setup request" signal transmitted to the eNodeB 22, or a region of an "S1APID" included in a "UE context release command". In other words, the mobile communication control system 1 according to the present example embodiment is able to keep down development cost of software and the like, by implementing an existing mobile communication control system with a function of redistributing a load between MMEs, using a group ID.

Note that, as a method in which the MME 10-1 notifies the S-GW 21 and the eNodeB 22 of a group ID, the mobile communication control system 1 according to the present example embodiment may define a new information element in an S1AP or a general packet radio service turning protocol (GTP).

Moreover, the setting unit 11-1 in the MME 10-1 according to the present example embodiment may switch a unit for controlling, with which another MME is controlled in such a way that the another MME takes over the processing of managing a communication state of UE, to either a group or UE, based on function switch information indicating whether to determine, as a group, the unit for controlling. In this case, based on the function switch information, the correspondent device 20 switches, to either a group or UE, a change unit of changing a target controlled with respect to UE from the MME 10-1 to another MME. As a method in which the mobile communication control system 1 is implemented with the function switch information, there is, for example, a method of embedding a function switch flag (function switch information) into a flag serving to notify of presence or absence of functional support, or a region or the like where a vendor function is notified, defined by TS29.274 and TS36.413. By this method, the mobile communication control system 1 is able to previously adjust whether to switch this function between nodes (an MME, an S-GW, and an eNodeB). By performing such function switch, the mobile communication control system 1 according to the present example embodiment is able to perform flexible communication control.

Additionally, the setting unit 11-1 in the MME 10-1 according to the present example embodiment may determine a value indicated by the above-described function switch information, based on, for example, communication states or the like of the UE 30-1 to UE 30-$m$, and may notify the correspondent device 20 of function switch information for which a value is determined.

Second Example Embodiment

Figure 5:
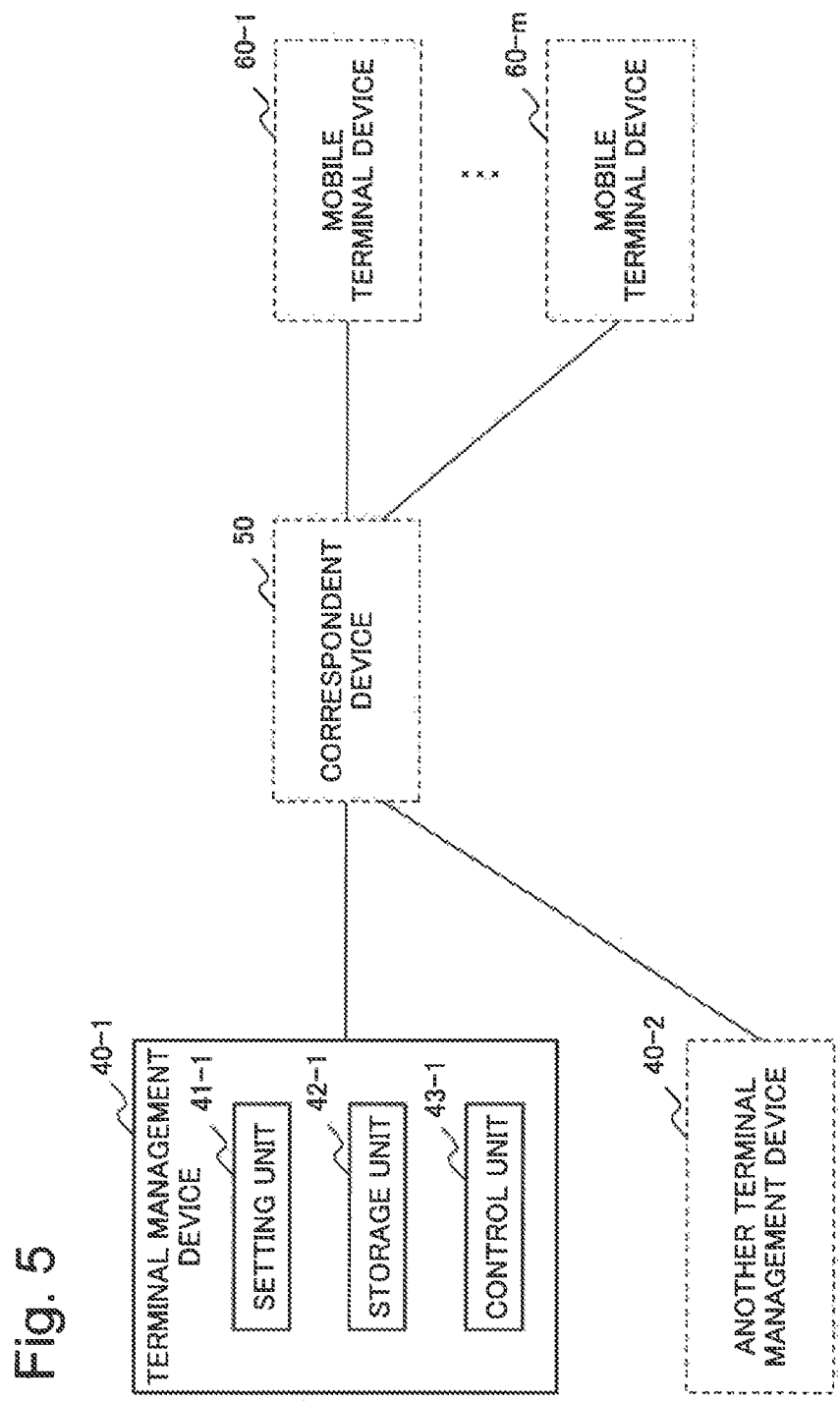
FIG. 5 is a block diagram illustrating a configuration of a terminal management device 40-1 according to a second example embodiment of the invention of the present application.

FIG. 5 is a block diagram conceptually illustrating a configuration of a terminal management device 40-1 according to a second example embodiment of the invention of the present application. The terminal management device 40-1 manages communication states of mobile terminal devices 60-1 to 60-$m$ (m is any integer of 1 or more), and controls a correspondent device 50 in such a way as to communicably connect the mobile terminal devices 60-1 to 60-$m$ to an external device (not illustrated). A function of another terminal management device 40-2 is also equivalent to that of the terminal management device 40-1.

The terminal management device 40-1 includes a setting unit 41-1, a storage unit 42-1, and a control unit 43-1.

By setting, based on a criterion, a group to which the mobile terminal device 60-1 to be managed belongs, the setting unit 41-1 generates group information associating the mobile terminal device 60-1 with the group. Then, when processing of managing communication states of the mobile terminal device 60-1 and the like belonging to the same group is taken over to the another terminal management device 40-2, the setting unit 41-1 notifies the correspondent device 50 of the group information in such a way that the correspondent device 50 is able to change control from the terminal management device 40-1 to the another terminal management device 40-2, based on the group information, with respect to the mobile terminal device 60-1 and the like belonging to the same group.

The storage unit 42-1 stores the group information.

The control unit 43-1 controls the another terminal management device 40-2, based on group information stored in the storage unit 42-1, in such a way that the another terminal management device 40-2 takes over the processing of managing communication states of the mobile terminal device 60-1 and the like with the group as a unit.

The mobile communication control system 1 according to the present example embodiment is able to decrease an information processing amount necessary, when a load of processing for mobile communication control is redistributed within a mobile communication system, between terminal management devices in the system. A reason for this is as follows. The setting unit 41-1 in the terminal management device 40-1 notifies the correspondent device 50 of group information generated by setting, for the mobile terminal device 60-1, a group to which the mobile terminal device 60-1 belongs. Then, the control unit 43-1 controls in such a way that the another terminal management device 40-2 performs, in a group unit, processing of taking over processing for mobile communication control from the terminal management device 40-1.

<Hardware Configuration Example>

Each unit in an MME and a terminal management device illustrated in FIGS. 1 and 5 in each of the example embodiments described above may also be achieved by dedicated hardware (HW) (electronic circuit). Moreover, in FIGS. 1 and 5, at least the following components can be considered as functional (processing) units (software modules) of a software program.

The setting units 11-1 and 41-1

The control units 13-1 and 43-1

Storage control functions of the storage units 12-1 and 42-1.

However, classifications of respective units illustrated in the drawings are components for convenience of description, and various components are conceivable at implementing. One example of a hardware environment in this case is described with reference to FIG. 6.

Figure 6:
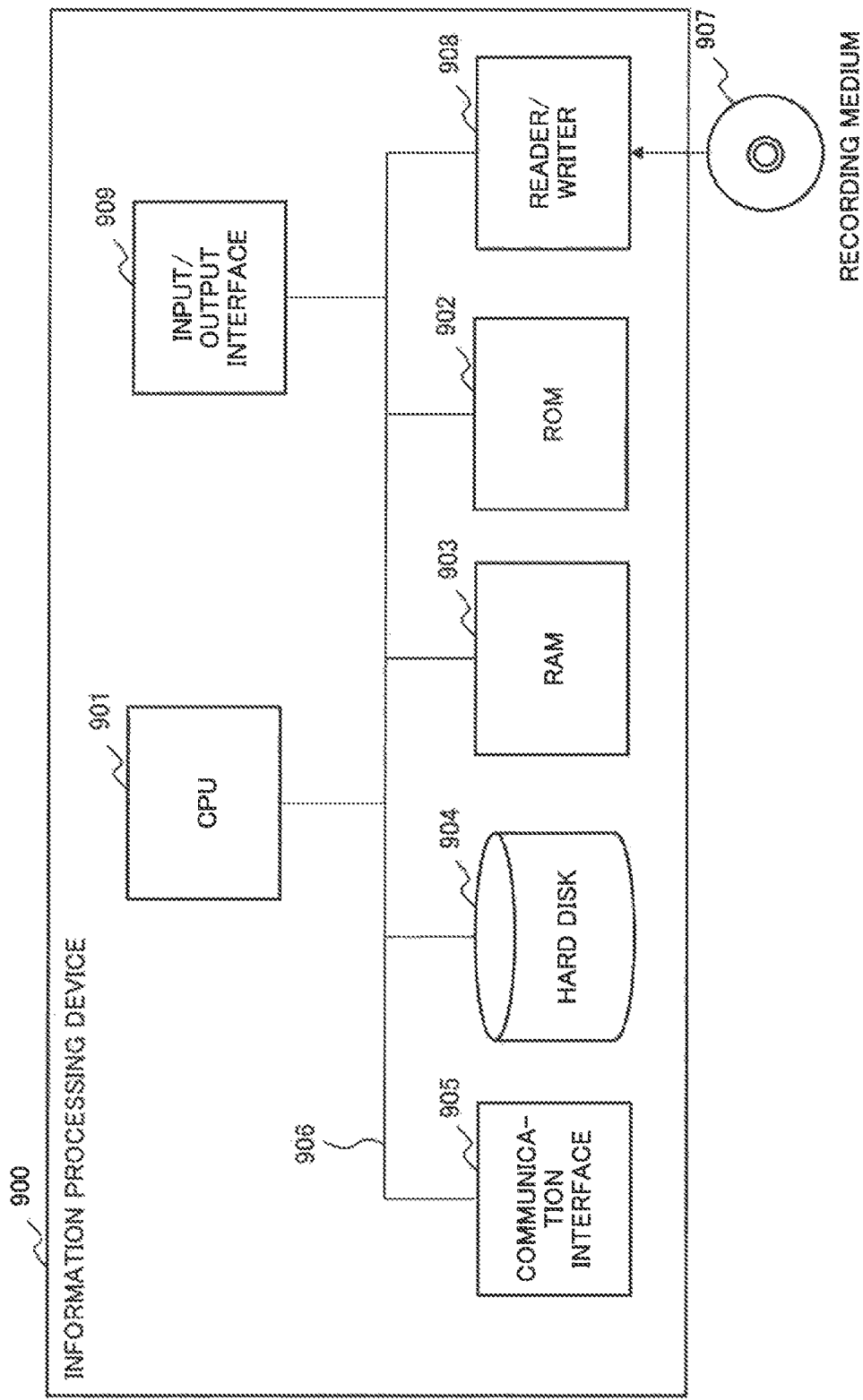
FIG. 6 is a block diagram illustrating a configuration of an information processing device being capable of executing an MME or a terminal management device according to each example embodiment of the invention of the present application.

FIG. 6 is a diagram exemplarily illustrating a configuration of an information processing device 900 (computer) being capable of executing an MME or a terminal management device according to each example embodiment of the invention of the present application. In other words, FIG. 6 represents a hardware environment which is a configuration of a computer (information processing device) being capable of achieving an MME or a terminal management device illustrated in FIGS. 1 and 5, and which is capable of achieving each function in the example embodiments described above.

The information processing device 900 illustrated in FIG. 6 includes the following components.

A central processing unit (CPU) 901,
A read only memory (ROM) 902,
A random access memory (RAM) 903,
A hard disk (storage device) 904,
A communication interface 905 with an external device,
A bus 906 (communication line),
A reader/writer 908 being capable of reading and writing data saved in a recording medium 907 such as a compact disc read only memory (CD-ROM),
An input/output interface 909.

In other words, the information processing device 900 including the components described above is a general computer in which the components are connected via the bus 906. The information processing device 900 includes a plurality of CPUs 901 in one case, or includes a multi-core CPU 901 in another case.

Then, the invention of the present application described with the above-described example embodiments as examples supplies the information processing device 900 illustrated in FIG. 6 with a computer program being capable of achieving the following functions. The functions are the functions which are the above-described components in block configuration diagrams (FIGS. 1 and 5) referred to in the description of the example embodiments, or functions in the sequence diagrams (FIGS. 2 to 4). Thereafter, the invention of the present application is achieved by reading, then interpreting, and executing the computer program in the CPU 901 of the hardware. Moreover, the computer program supplied into the device needs only to be saved in a readable/writable volatile memory (ROM 903) or a non-volatile storage device such as the ROM 902 and the hard disk 904.

Furthermore, in the above-described case, a general procedure can be adopted at present as a method of supplying a computer program into the hardware. The procedure includes, for example, a method of installing into the device via various kinds of recording media 907 such as a CD-ROM, a method of externally downloading via a communication line such as Internet, and the like. Then, in such a case, the invention of the present application can be considered to be configured by a code constituting the computer program, or the recording medium 907 saving the code.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2016-146265, filed on Jul. 26, 2016, the disclosure of which is incorporated herein in its entirety by reference.

The whole or part of the example embodiments disclosed above can be described as, but not limited to, the following supplementary notes.

(Supplementary Note 1)

A terminal management device being any one of a plurality of terminal management devices which manage communication states of one or more mobile terminal devices, and which control a correspondent device in such a way as to communicably connect the mobile terminal device to an external device, the terminal management device including:

a setting means for generating group information associating the mobile terminal device with the group, by setting, based on a criterion, a group to which the mobile terminal device to be managed belongs, and notifying the correspondent device of the group information in such a way that, when processing of managing communication states of the mobile terminal devices belonging to the same group is taken over to another terminal management device, the correspondent device is able to change an object of control from a local device to the another terminal management device, based on the group information, with respect to the mobile terminal devices belonging to the same group;

a storage means for storing the group information; and a control means for controlling the another terminal management device, in such a way that the another terminal management device takes over the processing of managing a communication state of the mobile terminal device with the group as a unit based on the group information stored in the storage means.

(Supplementary Note 2)

The terminal management device according to Supplementary note 1, wherein with a physical resource or a logical resource being included in the terminal management device and managing a communication state of the mobile terminal device, as a unit, the setting means sets the group associated with the physical resource or the logical resource.

(Supplementary Note 3)

The terminal management device according to Supplementary note 1, wherein with a process being executed by the terminal management device and managing a communication state of the mobile terminal device, as a unit, the setting means sets the group associated with the process.

(Supplementary Note 4)

The terminal management device according to Supplementary note 1, wherein the setting means determines the group, based on a number of the mobile terminal devices with communication states to be managed.

(Supplementary Note 5)

The terminal management device according to any one of Supplementary notes 1 to 4, wherein the setting means notifies the correspondent device of the group information by including the group information in at least one of identification information of which the correspondent device is notified, and with which an S1 application protocol is able to be identified, and identification information of which the correspondent device is notified, and with which a virtual direct circuit can be identified for each connection of a circuit.

(Supplementary Note 6)

A correspondent device which, being controlled by one of first and second terminal management devices managing communication states of one or more mobile terminal devices, communicably connects the mobile terminal device to an external device, wherein, after being notified, by the first terminal management device, of group information associating a group, set based on a criterion, to which the mobile terminal device to be managed belongs, with the mobile terminal device, the correspondent device changes an object of control from the first terminal management device to the second terminal management device, based on the group information, with respect to the mobile terminal devices belonging to the same group, when the second terminal management device takes over processing of managing communication states of the mobile terminal devices belonging to the same group from the first terminal management device.

(Supplementary Note 7)

A mobile communication control system including:

first and second terminal management devices which manage a communication state of one or more mobile terminal devices; and a correspondent device which communicably connects the mobile terminal device to an external device being controlled by at least the first terminal management device, wherein the first terminal management device includes a setting means for notifying the correspondent device of group information that is generated by setting, based on a criterion, a group to which the mobile terminal device to be managed belongs, and that associates the mobile terminal device with the group, a storage means for storing the group information, and a control means for controlling the second terminal management device in such a way that the second terminal management device takes over the processing of managing a communication state of the mobile terminal device with the group as a unit based on the group information stored in the storage means and, when the second terminal management device takes over the processing of managing communication states of the mobile terminal devices belonging to the same group from the first terminal management device, the correspondent device changes an object of control from the first terminal management device to the second terminal management device, based on the group information, with respect to the mobile terminal devices belonging to the same group.

(Supplementary Note 8)

The mobile communication control system according to Supplementary note 7, wherein, in the first terminal management device, based on function switch information indicating whether to determine, as the group, a unit for controlling the second terminal management device in such a way that the second terminal management device takes over the processing of managing a communication state of the mobile terminal device, the control means switches the unit for controlling to either the group or the mobile terminal device, and, based on the function switch information, the correspondent device switches a change unit of changing an object of control from the first terminal management device to the second terminal management device, to either the group or the mobile terminal device, with respect to the mobile terminal device.

(Supplementary Note 9)

A mobile communication control method including:

in a system including first and second terminal management devices which manage communication states of one or more mobile terminal devices, and a correspondent device which communicably connects the mobile terminal device to an external device being controlled by the terminal management device, by the first terminal management device, notifying the correspondent device of group information that is generated by setting, based on a criterion, a group to which the mobile terminal device to be managed belongs, and that associates the mobile terminal device with the group, storing the group information in a storage means, and controlling the second terminal management device in such a way that the second terminal management device takes over the processing of managing a communication state of the mobile terminal device with the group as a unit based on the group information stored in the storage means; and, by the correspondent device, when the second terminal management device takes over the processing of managing communication states of the mobile terminal devices belonging to the same group from the first terminal management device, changing an object of control from the first terminal management device to the second terminal management device, based on the group information, with respect to the mobile terminal devices belonging to the same group.

(Supplementary Note 10)

A terminal management program causing any one of a plurality of terminal management devices, which manage communication states of one or more mobile terminal devices, and which control a correspondent device in such a way as to communicably connect the mobile terminal device to an external device, to execute:

setting processing of setting, based on a criterion, a group to which the mobile terminal device to be managed belongs, thereby generating group information associating the mobile terminal device with the group, and then notifying the correspondent device of the group information in such a way that, when processing of managing communication states of the mobile terminal devices belonging to the same group is taken over to another terminal management device, the correspondent device is able to change an object of control from a local device to the another terminal management device, based on the group information, with respect to the mobile terminal devices belonging to the same group;

storage processing of storing the group information in a storage means; and control processing of controlling the another terminal management device, in such a way that the another terminal management device takes over the processing of managing a communication state of the mobile terminal device comprehensively with the group as a unit based on the group information.

(Supplementary Note 11)

The mobile communication control system according to Supplementary note 7, wherein, in the first terminal management device, with a physical resource or a logical resource being included in the terminal management device and managing a communication state of the mobile terminal device, as a unit, the setting means sets the group associated with the physical resource or the logical resource.

(Supplementary Note 12)

The mobile communication control system according to Supplementary note 7, wherein in the first terminal management device, with a process being executed by the terminal management device and managing a communication state of the mobile terminal device, as a unit, the setting means sets the group associated with the process.

(Supplementary Note 13)

The mobile communication control system according to Supplementary note 7, wherein, in the first terminal management device, the setting means determines the group, based on a number of the mobile terminal devices with communication states to be managed.

(Supplementary Note 14)

The mobile communication control system according to Supplementary note 7, wherein the correspondent device includes a base station communicably connecting the mobile terminal device to the external device, and, in the first terminal management device, the setting means notifies the base station of the group information by including the group information in identification information of which the base station is notified, and with which an S1 application protocol is able to be identified.

(Supplementary Note 15)

The mobile communication control system according to Supplementary note 14, wherein the correspondent device includes a gateway accommodating the base station, and, in the first terminal management device, the setting means notifies the gateway of the group information by including the group information in identification information of which the gateway is notified, and with which a virtual direct circuit is able to be identified for each connection of a circuit.

(Supplementary Note 16)

The mobile communication control system according to Supplementary note 7, wherein, in the first terminal management device, based on function switch information indicating whether to determine, as the group, a unit for controlling the second terminal management device in such a way that the second terminal management device takes over the processing of managing a communication state of the mobile terminal device, the control means switches the unit for controlling to either the group or the mobile terminal device, and, based on the function switch information, the correspondent device switches a change unit of changing an object of control from the first terminal management device to the second terminal management device, to either the group or the mobile terminal device, with respect to the mobile terminal device.

(Supplementary Note 17)

The mobile communication control system according to Supplementary note 16, wherein, in the first terminal management device, the control means determines a value indicated by the function switch information, based on communication states of one or more mobile terminal devices, and notifies the correspondent device of the function switch information for which the value is determined.

REFERENCE SIGNS LIST

1 Mobile communication control system
10 MME group
10-1 to 10-n MME
11-1 Setting unit
12-1 Storage unit
13-1 Control unit
20 Correspondent device
21 S-GW
210 Storage unit
22 eNodeB
220 Storage unit
30-1 to 30-m UE
40-1 Terminal management device
40-2 Another terminal management device
41-1 Setting unit
42-1 Storage unit
43-1 Control unit
50 Correspondent device
60-1 to 60-m Mobile terminal device
900 Information processing device
901 CPU
902 ROM
903 RAM
904 Hard disk (storage device)
905 Communication interface
906 Bus
907 Recording medium
908 Reader/writer
909 Input/output interface

What is claimed is:

1. A terminal management device being any one of a plurality of terminal management devices which manage communication states of one or more mobile terminal devices, and which control a correspondent device in such a way as to communicably connect the mobile terminal device to an external device, the terminal management device comprising:

a setting unit configured to generate group information associating the mobile terminal device with the group, by setting, based on a criterion, a group to which the mobile terminal device to be managed belongs, and notify the correspondent device of the group information in such a way that, when processing of managing communication states of the mobile terminal devices belonging to the same group is taken over to another terminal management device, the correspondent device is able to change control from the terminal management device to the another terminal management device, based on the group information, with respect to the mobile terminal devices belonging to the same group;

a storage unit configured to store the group information; and a control unit configured to control the another terminal management device in such a way that the another terminal management device takes over the processing of managing a communication state of the mobile terminal device with the group as a unit based on the group information stored in the storage unit.

2. The terminal management device according to claim 1, wherein with a physical resource or a logical resource being included in the terminal management device and managing a communication state of the mobile terminal device, as a unit, the setting unit sets the group associated with the physical resource or the logical resource.

3. The terminal management device according to claim 1, wherein with a process being executed by the terminal management device and managing a communication state of the mobile terminal device, as a unit, the setting unit sets the group associated with the process.

4. The terminal management device according to claim 1, wherein the setting unit determines the group, based on a number of the mobile terminal devices with communication states to be managed.

5. The terminal management device according to claim 1, wherein the setting unit notifies the correspondent device of the group information by including the group information in at least one of identification information of which the correspondent device is notified, and with which an S1 application protocol is able to be identified, and identification information of which the correspondent device is notified, and with which a virtual direct circuit can be identified for each connection of a circuit.

6. A mobile communication control system comprising:

first and second terminal management devices which manage communication states of one or more mobile terminal devices; and a correspondent device which communicably connects the mobile terminal device to an external device being controlled by at least the first terminal management device, wherein the first terminal management device includes a setting unit configured to notify the correspondent device of group information that is generated by setting, based on a criterion, a group to which the mobile terminal device to be managed belongs, and that associates the mobile terminal device with the group, a storage unit configured to store the group information, and a control unit configured to control the second terminal management device in such a way that the second terminal management device takes over the processing of managing a communication state of the mobile terminal device with the group as a unit based on the group information stored in the storage unit and, when the second terminal management device takes over the processing of managing communication states of the mobile terminal devices belonging to the same group from the first terminal management device, the correspondent device changes control from the first terminal management device to the second terminal management device, based on the group information, with respect to the mobile terminal devices belonging to the same group.

7. A mobile communication control system comprising:

first and second terminal management devices which manage communication states of one or more mobile terminal devices; and a correspondent device which communicably connects the mobile terminal device to an external device being controlled by at least the first terminal management device, wherein the first terminal management device includes a setting unit configured to notify the correspondent device of group information that is generated by setting, based on a criterion, a group to which the mobile terminal device to be managed belongs, and that associates the mobile terminal device with the group, a storage unit configured to store the group information, and a control unit configured to control the second terminal management device according to function switch information in such a way that the second terminal management device takes over the processing of managing a communication state of the mobile terminal device either with the group as a unit based on the group information stored in the storage unit or with the mobile terminal device, based on the function switch information, the correspondent device switches a change unit of changing control from the first terminal management device to the second terminal management device, to either the group or the mobile terminal device, with respect to the mobile terminal device.

8. A mobile communication control method:

using first and second terminal management devices which manage communication states of one or more mobile terminal devices and a correspondent device which communicably connects the mobile terminal device to an external device being controlled by the first or second terminal management device comprising:

by the first terminal management device, notifying the correspondent device of group information that is generated by setting, based on a criterion, a group to which the mobile terminal device to be managed belongs, and that associates the mobile terminal device with the group, storing the group information in storage means, and controlling the second terminal management device in such a way that the second terminal management device takes over the processing of managing a communication state of the mobile terminal device with the group as a unit based on the group information stored in the storage means; and, by the correspondent device, when the second terminal management device takes over the processing of managing communication states of the mobile terminal devices belonging to the same group from the first terminal management device, changing control from the first terminal management device to the second terminal management device, based on the group information, with respect to the mobile terminal devices belonging to the same group.

9. The mobile communication control system according to claim 6, wherein, in the first terminal management device, with a physical resource or a logical resource being included in the terminal management device and managing a communication state of the mobile terminal device, as a unit, the setting unit sets the group associated with the physical resource or the logical resource.

10. The mobile communication control system according to claim 6, wherein, in the first terminal management device, with a process being executed by the terminal management device and managing a communication state of the mobile terminal device, as a unit, the setting means unit sets the group associated with the process.

11. The mobile communication control system according to claim 6, wherein, in the first terminal management device, the setting means unit determines the group, based on a number of the mobile terminal devices with communication states to be managed.

12. The mobile communication control system according to claim 6, wherein the correspondent device includes a base station communicably connecting the mobile terminal device to the external device, and, in the first terminal management device, the setting unit notifies the base station of the group information by including the group information in identification information of which the base station is notified, and with which an S1 application protocol is able to be identified.

13. The mobile communication control system according to claim 12, wherein the correspondent device includes a gateway accommodating the base station, and, in the first terminal management device, the setting means unit notifies the gateway of the group information by including the group information in identification information of which the gateway is notified, and with which a virtual direct circuit is able to be identified for each connection of a circuit.

14. The mobile communication control system according to claim 6, wherein, in the first terminal management device, the control unit determines a value indicated by the function switch information, based on communication states of one or more mobile terminal devices, and notifies the correspondent device of the function switch information for which the value is determined.

* * * * *